455/6

United States Patent [19]

Konishi

[11] 3,882,397

[45] May 6, 1975

[54] CARRIER CONVERTING EQUIPMENT

[75] Inventor: Yoshihiro Konishi, Sagamihara, Japan

[73] Assignee: Nippon Hoso Kyokai, Tokyo, Japan

[22] Filed: Nov. 26, 1973

[21] Appl. No.: 419,052

[30] Foreign Application Priority Data

Nov. 30, 1972 Japan .............................. 47-119312

Apr. 18, 1973 Japan .............................. 48-43063

[52] U.S. Cl. .......................... 325/449; 325/9; 332/1

[51] Int. Cl. .............................................. H04b 7/20

[58] Field of Search ........ 332/1; 325/439, 449, 442, 325/349, 445, 487, 9

[56] References Cited

UNITED STATES PATENTS

| | | | |
|---|---|---|---|
| 2,350,869 | 6/1944 | Bliss | 325/487 |
| 3,166,713 | 1/1965 | Chang et al. | 325/449 |
| 3,404,318 | 10/1968 | Lindmayer et al. | 325/449 |
| 3,484,698 | 12/1969 | Ruppli | 325/442 |

OTHER PUBLICATIONS

Marchand, Frequency Modulation, Murray Hill Books, Inc., New York, 1948, pp. 181, 182.

*Primary Examiner*—George H. Libman

*Attorney, Agent, or Firm*—Stevens, Davis, Miller & Mosher

[57] ABSTRACT

A carrier converting equipment to be used such as for the reception of a satellite television broadcasting signal by an ordinary television receiver by adding a very simple adapter for converting such satallite signal for instance a frequency modulated microwave signal into an amplitude modulated VHF wave signal. The frequency modulated receiving input wave is amplitude modulated by an amplitude modulation adding circuit in which the wave is modulated for instance to have larger amplitude at the higher frequency portion and smaller amplitude at the lower frequency portion. This amplitude modulated wave is supplied to a non-linear element together with a desired carrier frequency signal. The carrier frequency signal is amplitude modulated in accordance with the amplitude of the applied amplitude modulated signal due to conductance variation of the non-linear element.

12 Claims, 17 Drawing Figures

CARRIER CONVERTING EQUIPMENT

BACKGROUND OF THE INVENTION

1. Field of the Invention

The present invention relates to carrier converting equipment for converting a carrier wave of an amplitude modulated signal (AM signal) into a carrier wave of a desired frequency. The carrier converting equipment of the present invention is particularly suitable for use in a television receiver for a satellite television broadcasting system.

2. Description of the Prior Art

In the hitherto known carrier converting equipment at a receiver of a satellite television broadcasting system, the frequency modulated SHF wave is at first converted into a UHF-FM signal by means of a SHF-UHF converter. The UHF-FM signal thus obtained is amplified and limited for the amplitude by an amplifying and amplitude limiting circuit and then demodulated into a video signal by using a frequency discriminator. This video signal is used to apply amplitude modulation for a VHF carrier wave derived from a VHF range oscillator by using a modulator.

Such a known system has a drawback in that the system is complicated and includes a number of stages.

SUMMARY OF THE INVENTION

The present invention has for its object to realize carrier converter equipment having a more simple construction, which is able to make direct carrier wave conversion of a modulated signal wave, such as for instance to convert the aforementioned UHF-FM signal directly into a frequency stabilized VHF-AM signal, while eliminating the need of using the frequency discriminator and the modulator used in the known carrier converting equipment.

In one aspect of the present invention the carrier converting equipment for converting an amplitude modulated signal of a first carrier wave into a corresponding amplitude modulation signal of a second carrier wave of which the frequency is different from that of the first carrier signal comprises a non-linear element, means for applying said first carrier wave and said second carrier wave simultaneously to said non-linear element, and means for deriving an amplitude modulated second carrier wave modulated in accordance with the variation of conductance of said non-linear element in which the variation corresponds to the amplitude of the amplitude modulated first carrier wave so that the second carrier wave is amplitude modulated according to the amplitude of the first carrier wave.

In the other aspect of the invention the carrier converting equipment further comprises an amplitude modulation adding circuit which modulates an input frequency modulated carrier wave in amplitude corresponding to the modulated frequency of the input carrier wave.

DESCRIPTION OF THE PREFERRED EMBODIMENT

In order to give a clear outline of the present invention various embodiments thereof will be explained in accordance with the accompanied drawings.

Figure 1:
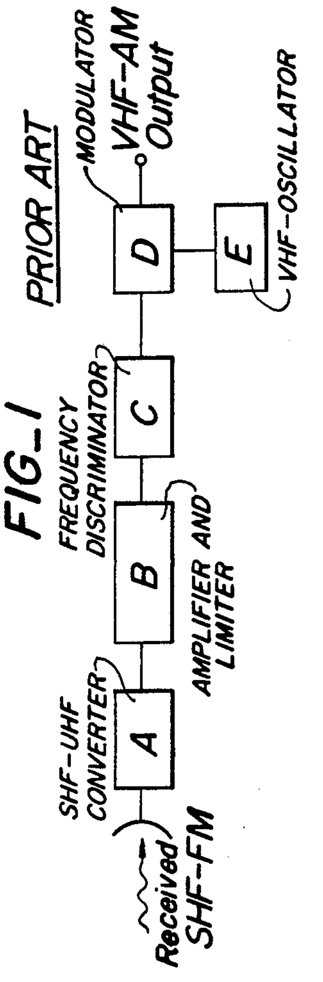
FIG 1 PRIOR ART
FIG. 1 is a block diagram showing one embodiment of a conventional carrier converting equipment.

FIG. 1 illustrates a simplified block diagram of a carrier converting equipment of a conventional type.

In FIG. 1, block A is a SHF-UHF converter to which a frequency modulated SHF wave (SHF-FM) is supplied. In the converter A the SHF-FM wave is converted into a UHF-FM wave and this UHF-FM wave is amplified and limited in the amplitude thereof in an amplifying and limiting circuit B. Thus amplified and treated the UHF-FM signal is demodulated into a video signal by a frequency discriminator C. The video signal is used to modulate a VHF carrier wave supplied from a VHF oscillator E in its amplitude to obtain an amplitude modulated VHF wave (VHF-AM) at its output. As explained before this known carrier converting equipment comprises a frequency discriminator C and a modulator D, which makes the equipment complicated. The present invention is designed to eliminate the need of the discriminator C and the modulator D and to realize novel equipment able to produce a VHF-AM signal having stable frequency directly from the UHF-FM signal.

Figure 2B:
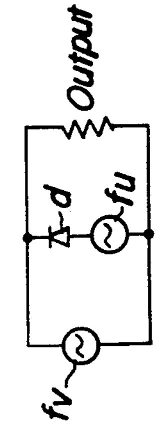
FIG. 2*b* is a simplified circuit diagram for explaining the operation of the circuit shown in FIG. 2*a*, FIGS. 3*a*, 3*b* and 3*c* show waveforms in the circuit of FIG. 2*a*.
Figure 2A:
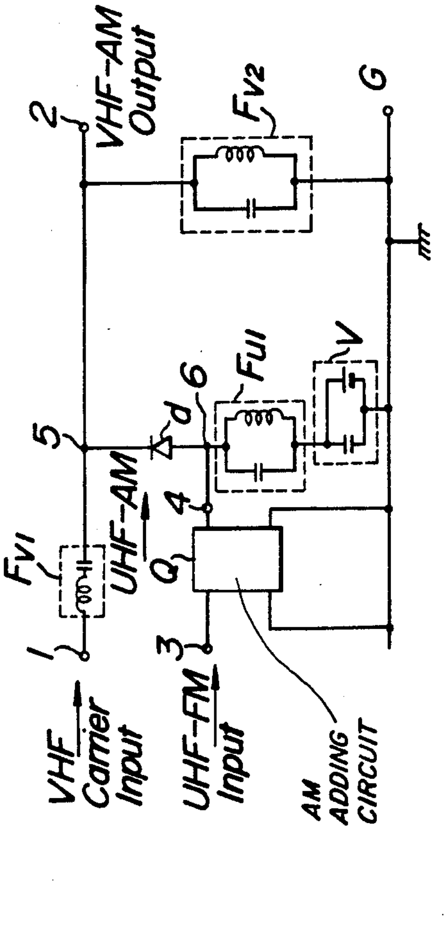
FIG. 2*a* is a circuit diagram of one embodiment of carrier converting equipment according to the present invention.

FIG. 2*a* shows a circuit diagram of one embodiment of the carrier converter equipment according to the present invention utilizing a non-linear equipment which varies its conductance in accordance with the current passing through it.

Figure 4A:
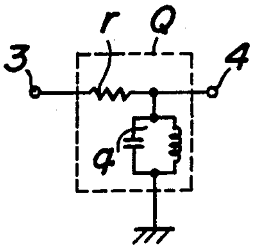
FIG. 4*a* is one embodiment of a practical circuit for the part of the circuit shown in FIG. 2*a*.

The circuit comprises terminals 1, 2, 3 and 4 and one ground terminal G. To the terminal 3 a UHF-FM input is applied. The UHF-FM signal is treated in an amplitude modulation adding circuit Q of which detail is shown in FIG. 4*a* and in a manner described later and the signal is amplitude modulated and appears at terminal 4 as a UHF-AM signal. The circuit inside the terminals 1, 2, 4 and G consists of an essential portion of the carrier converter of the present invention.

The circuit Q is required for obtaining a VHF-AM wave from a UHF-FM wave which may be converted from a SHF-FM wave. Therefore, for the conversion between the UHF-AM wave to the VHF-AM wave this circuit Q is not required.

As shown in FIG. 2a, the carrier converting circuit comprises a VHF band series resonant circuit $F_{v1}$, a VHF band parallel resonant circuit $F_{v2}$, a UHF band parallel resonant circuit $F_{u1}$, a non-linear element *d* for the carrier conversion, which may be for example a variable resistance diode which had been used in a normal mixer, and a voltage source V shunted by a capacitor for biasing the diode *d*.

Figure 3A:
Figure 3B:
Figure 3C:
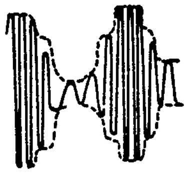
Figure 4B:
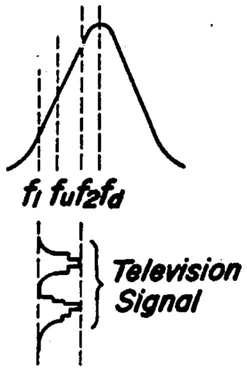
FIG. 4*b* is a waveform for explaining the operation of the circuit shown in FIG. 4*a*.

At first, the function of the amplitude modulation adding circuit Q will be explained. This amplitude modulation adding circuit Q is a circuit used to modify amplitude of a frequency modulated UHF wave having the waveform for instance shown in FIG. 3a applied to its input terminal 3 to an amplitude as shown in FIG. 3b, i.e., to have larger amplitude at higher frequency and smaller amplitude at lower frequency. FIG. 4a shows one practical embodiment of a circuit having the abovementioned modulating function. Assuming that a frequency modulated wave of a television signal is given a frequency $f_2$ at a peak value of the synchronizing signal and is given a frequency $f_1$ at the white signal of the picture as shown in FIG. 4b (wherein $f_1<f_2$) and by selecting the center frequency $f_d$ of the parallel tuning circuit *q* shown in FIG. 4a to have a relation;

$$f_d > f_2$$

then the UHF-FM wave is shown in FIG. 3a is amplitude modulated by the inclined nature of the transmission characteristics of the tuning circuit as shown in FIG. 4b to have larger amplitude at the higher frequency $f_2$ and to have smaller amplitude at the lower frequency $f_1$ and the signal as shown in FIG. 3b may be obtained. For instance, by applying a signal frequency modulated by a television signal to the circuit Q such as shown in FIG. 2a, an amplitude modulated FM signal having larger amplitude at the peak of the synchronizing signal and smaller amplitude and lower frequency at the white signal such as shown in FIG. 3c can be obtained.

Then, the operation of the carrier converting circuit portion as shown in FIG. 2a will be explained. In order to simplify the explanation, at first the case when a UHF wave $f_u$ is applied to the variable resistance diode *d* through terminal 6 and a VHF wave $f_v$ is applied to the same diode *d* through terminal 5 is taken into account. FIG. 2b is a more simplified circuit diagram of this case. Assuming that the amplitude of the VHF wave $f_v$ is substantially smaller than the amplitude of the UHF wave $f_u$, the major signal component appearing at the terminal of the variable resistance diode *d* besides the VHF wave $f_v$ and the UHF wave $f_u$ will be;

intermediate frequency component:

$$f_i = f_u - f_v$$

sum frequency component:

$$f_i' = f_u + f_v$$

and the image frequency component:

$$f_m = 2f_u - f_v$$

among the general components expressed by:

$$mf_u \pm nf_v.$$

Figure 5:
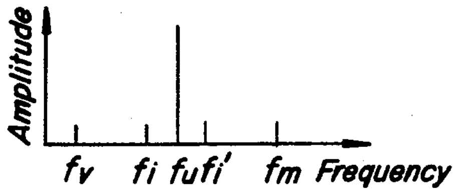
FIG. 5 is a frequency-amplitude vector diagram of the signal component flowing in the circuit shown in the circuit of FIG. 2*a*.
Figure 6:
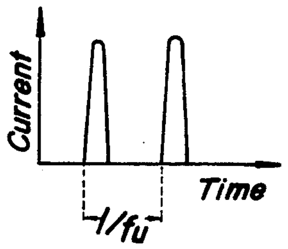
FIG. 6 is an explanatory diagram for showing the time relationship of a current flowing in the circuit shown in FIG. 2*a*.

FIG. 5 shows the spectral distribution of the signal components. By assuming frequency $f_u$ as 450 MHz and $f_v$ as 100 MHz, $f_i$ becomes 350 MHz, $f_i'$ 550 MHz and $f_m$ as 800 MHz. In case the amplitude of the UHF wave $f_u$ is larger than that of the VHF wave $f_v$ as assumed previously in the present embodiment, then a current having a $1/f_u$ period as shown in FIG. 6 will flow through the diode *d*. Accordingly, the conductance $G_b$ of the diode *d* will vary according to a periodic function having the period $1/f_u$ as shown in FIG. 6. The conductance $G_b$ may be expressed in an equation by extending the above equation by the terms of $1/f_u$ period as follows.

$$G_b = \sum_{n=-\infty}^{\infty} g_{nu} e^{j n \omega_u t} \quad (1)$$

wherein $g_{nu}$ is the load conductance viewed for outside from the diode *d* for the frequency $f_u$.

In general in such a frequency conversion as the heterodyne system, the sum frequency component $f_i'$ may become a substantially higher frequency component if compared with the frequency of the other components due to the fact that the local oscillation frequency which corresponds to the aforementioned $f_v$ is selected to be the same order of the carrier frequency which corresponds to the abovementioned $f_u$ and that the intermediate frequency $f_i$ as the difference frequency component thereof is to be a low frequency advantageously used for the amplification and the selection of the signals. Accordingly, if we assume that both the ends of the diode *d* becomes short circuited impedance at the frequency $f_i'$, the voltage $V$ applied to the diode *d* comprises components of $f_v, f_u, f_i, f_m$ and the relation will be expressed in the following equation.

$$\dot{V} = V_i e^{j\omega_i t} + V_m e^{j\omega_m t} + V_v e^{j\omega_v t} + V_u e^{j\omega_u t} \quad (2)$$

The current $I$ flowing through the diode *d* generally includes high frequency components expressed by *mfu+nfv* besides the main components of $f_v, f_u, f_i$ and $f_m$. However, by neglecting the high frequency components, the current $I$ may be expressed by the following equation.

$$\dot{I} = I_{ie}^{j\omega_i t} + I_{me}^{j\omega_m t} + I_{ve}^{j\omega_v t} + I_{ue}^{j\omega_u t} \quad (3)$$

On the other hand, there is the following relationship, $$\left.\begin{array}{c} G_b \cdot v = i \\ v = \dot{V} + \dot{V}^* \\ i = \dot{I} + \dot{I}^* \end{array}\right\} \quad (4)$$

By using the equations (1), (2), (3) and (4), the input admittance $Y_v$ can be calculated in the following manner.

herein, $$\left.\begin{aligned} Y_v &= Y_{vv} - \frac{Y_{vi}^2}{Y_{ii} + g_i} \\ Y_{vv} &= g_o - \frac{g_{2u}^2}{g_o + y_m^*} \\ Y_{vi} &= g_u - \frac{g_{2u}^2}{g_o + y_m^*} \\ Y_{ii} &= g_o - \frac{g_u^2}{g_o + y_m^*} \end{aligned}\right\} \quad (5)$$

wherein $g_i$ and $y_m$ are load conductance and load admittance viewed from the diode *d* for the outside at the frequency $f_i$ and $f_m$, respectively.

In the circuit shown in FIG. 2a, the parallel resonant circuit $F_{u1}$ resonating for the frequency $f_u$ and the parallel resonant circuit $f_{v2}$ resonating for $f_v$ both become short circuit impedances at frequencies $f_i$ and $f_m$. On the other hand, the series resonant circuit $F_{v1}$ resonating to the frequency $f_v$ becomes an open impedance at the frequencies $f_i$ and $f_m$. Accordingly, $g_i$ and $y_m$ of equation (5) assume an infinite value at the above frequencies. Namely, the following relation may be obtained.

$$g_i = y_m = \infty \quad (6)$$

In this condition, the components $f_i$ and $f_m$ do not appear at the output terminal 2, because they are short-circuited. Therefore, by introducing the relation of the equation (6) into equation (5), we may obtain the following simple relation.

$$y_v = g_o \quad (7)$$

Figure 7:
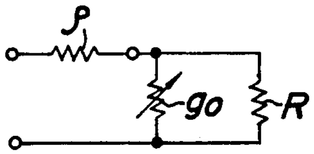
FIG. 7 is an equivalent circuit diagram of the circuit shown in FIG. 2*a*.

In the above equation, $g_o$ means physically the mean value of the conductance of the diode *d*, which varies according to the variation of the diode current varying as a periodic function of the period $1/f_u$ as shown in FIG. 6. When amplitude of the $f_u$ component varies, the diode current varies accordingly and the mean value $g_o$ of the conductance of the diode *d* varies accordingly. The relation of the variation is as follows;

amplitude of the $f_u$ component large → $g_o$ large amplitude of the $f_u$ component small → $g_o$ small Accordingly, an equivalent circuit diagram of the circuit shown in FIG. 2a with respect to the VHF band becomes as shown in FIG. 7. In FIG. 7, $\rho$ is the internal impedance of the VHF carrier source (not shown), $g_o$ is conductance of the variable resistance diode, and R is an input impedance of the outer-circuit (not shown) at the output side.

Figure 8:
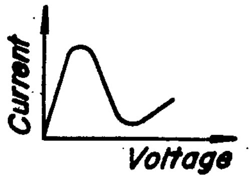
FIG. 8 is a current-voltage characteristic curve of a tunnel diode.
Figure 9:
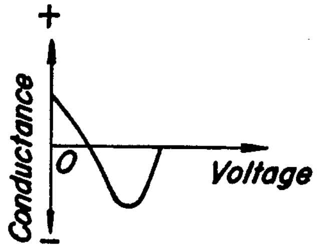
FIG. 9 is a conductance-voltage characteristic curve of the tunnel diode.

In case the variable resistance diode forming the non-linear element for the carrier conversion is a tunnel diode for example, the voltage-current characteristic is as shown in FIG. 8 and the relation between the conductance and the voltage is as shown in FIG. 9. Namely, at a larger amplitude range of the UHF wave, $g_o$ assumes negative value and at a range of smaller amplitude of the UHF wave the $g_o$ assumes a positive value. As also can be understood by the equivalent circuit diagram shown in FIG. 7, the VHF band wave is amplified in the larger amplitude range of the UHV wave, but is not amplified in the smaller amplitude range of the UHF band wave. Based on this principle, the VHF carrier wave applied from the input terminal 1 is amplitude modualted according to the amplitude of the UHF-AM wave and which may be derived from the output terminal 2 as VHF-AM wave. From another viewpoint, it can be said that the amplitude modulation of the UHF-AM wave applied at the terminal 6 of the diode *d* is transferred to the VHF carrier wave. In this case, the use of the tunnel diode is quite advantageous, since the circuit can sufficiently be applicable for a case of considerably small input signal power of the UHF wave such as for instance −10dBm, thus the carrier conversion can be effected only in the high frequency stages.

In the foregoing explanation, the consideration was given for a case of obtaining a VHF-AM wave such as used in an ordinary television broadcasting from a SHF-FM wave used in the satellite broadcasting system so that the conversion is in the following order.

SHF-FM → UHF-FM → UHF-AM → VHF-AM

However, it should be noted that the conversion from SHF-FM into UHF-FM does not constitute a constructional feature of the present invention.

Further example of the carrier converting equipment using the non-linear element will be explained by referring to FIG. 10.

Figure 10:
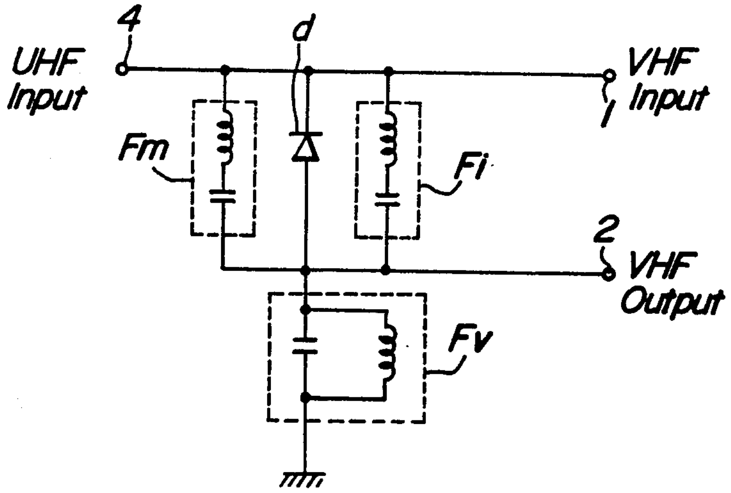
FIG. 10 is a circuit diagram of a different embodiment of the carrier converting equipment according to the present invention.
Figure 11:
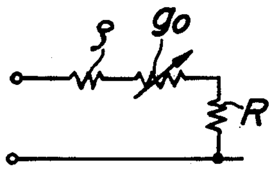
FIG. 11 is an equivalent circuit diagram of the circuit shown in FIG. 10, and FIG. 12 and FIG. 13 are explanatory diagrams for two further embodiments of the present invention.

In the carrier converting equipment shown in FIG. 10, the UHF-AM input is applied from input terminal 4 and the VHF carrier input is applied from input terminal 1. A series resonant circuit $F_m$ resonating to the image frequency component $f_m$ and a series resonant circuit $F_i$ resonating to the intermediate frequency component $f_i$ are connected in parallel to the variable resistance diode *d* so as to short circuit the diode *d* with respect to $f_m$ and $f_i$ components. The amplitude modulated VHF-AM output is obtained across a parallel resonant circuit $f_v$ and can be derived out from terminal 2. An equivalent circuit diagram of the circuit shown in FIG. 10 with respect to the VHF component is as shown in FIG. 11, in which the conductance $g_o$ of the diode *d* is inserted in series between the VHF carrier source $\rho$ and an outer circuit R at the output side. The conductance $g_o$ of the diode *d* varies in accordance with the variation of the amplitude of the UHF-AM wave. Also in this embodiment, the amplitude of the VHF carrier wave varies in accordance with the variation of the conductance of the diode *d* so that amplitude modulation of the VHF carrier wave is obtained.

In order to obtain still further improvement of the carrier converting equipment for converting an amplitude modulated wave of a certain carrier frequency signal into an amplitude modulated wave of a different carrier frequency signal by using a non-linear element and using the conductance variation of the non-linear element in accordance with amplitude of the current passing through the element, it is possible to additionally use a non-reversible element at input-output circuit thereof.

Figure 12:
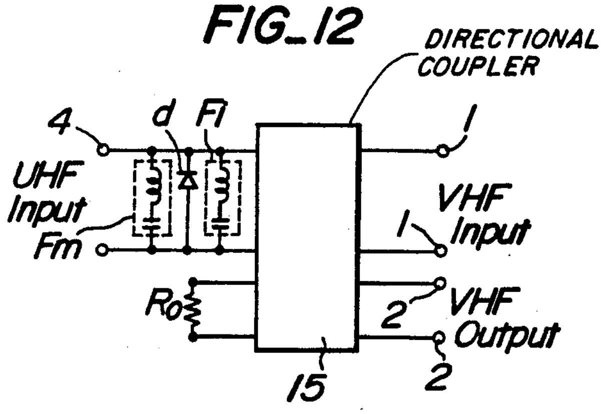
Figure 13:
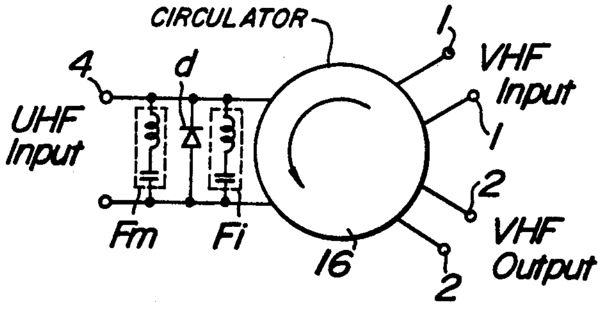

FIGS. 12 and 13 show two different circuits of such modified carrier converting equipment. In the FIGS. 12 and 13 those elements corresponding to that in FIG. 2a or FIG. 10 are designated by identical reference numerals. The amplitude coverting function of the non-linear element is the same as explained with respect to FIGS. 2a and 10 so that a detailed explanation of the circuit portion including the non-linear element is omitted.

The embodiment shown in FIG. 12 comprises a −3dB directional coupler 15 between the terminals 1 and 2 shown in the circuit shown in FIG. 2a or FIG. 10. In this circuit $R_o$ is an absorption resistance.

In this embodiment, the amplified modulated UHF input signal is applied to the diode *d* via terminal 4. The conductance of the diode *d* varies according to amplitude of the UHF input signal. The VHF carrier input is supplied via input terminal 1 and through the −3dB directional coupler 15 to diode *d*. Signal variation of the conductance of the diode *d* is derived from terminal 2 through the −3dB directional coupler 15.

In this embodiment since the −3dB directional coupler 15 is employed, the resonant circuit $F_{v1}$, $F_{v2}$ or $F_v$ shown in FIGS. 2a and 10 are not required.

In the other embodiment shown in FIG. 13 a circulator 16 is inserted between the circuit shown in FIG. 2a or FIG. 10 and circuit terminals 1 and 2. Also in this embodiment the amplitude modulated UHF input signal is supplied to the diode *d* via terminal 4 and varies the conductance of the diode *d* in accordance with the amplitude of the UHF input signal and the VHF carrier input is applied from input terminal 1. The conducting direction of the circulator 16 is as indicated by the arrow in FIG. 13 so that the input VHF carrier is applied to the diode *d* and amplitude modulated therein and further derived from terminal 2 through the circulator 16. Also in this case the resonant circuit $F_{v1}$, $F_{v2}$ or $F_r$ contained in the circuits shown in FIG. 2a and FIG. 10 can be eliminated.

As explained above, the carrier converting equipment using the non-linear element according to the present invention utilizes the variation of conductance of a non-linear element such as, for instance, a variable resistance diode. There is applied to the diode a signal component of the amplitude modulated current and at the same time there is applied a carrier component current to be modulated so as to obtain variation of the carrier component current by the variation of conductance of the diode according to the amplitude variation of the amplitude modulated signal wave so as to obtain an amplitude modulation product of the carrier wave, and at the same time the spurious component such as the image frequency component $f_m$ and the intermediate frequency component $f_i$ produced simultaneously are removed by means of a filter function of a resonant circuit combined with the diode. Accordingly, in the present invention the conventional circuit construction for converting the carrier frequency from an FM wave to an AM wave employing means for demodulating the modulated signal wave and by using the modulated output the required carrier wave of the necessary frequency is substantially simplified. Furthermore, since the signal conversion is effected in high frequency stages having a low signal level the signal amplification stages required in the demodulation and modulation of the signals can greatly be reduced. The equipment further has an advantage in that no loss is added in the detection stages.

In the conventional system if only the carrier frequency is converted by means of a simple heterodyne system without altering the signal modulation system such as AM there had been a disadvantage in that the output amplitude modulation carrier frequency may comprise variation of carrier frequency in case the carrier frequency of the original amplitude modulated wave deviates. However, according to the present invention the carrier frequency in the output side may be selected entirely independent from the carrier frequency of the input circuit. Accordingly, the signal may be transmitted always in a certain carrier frequency by merely using a stable oscillation source for the output carrier wave.

Furthermore, in the carrier converting equipment according to the present invention even in the case of a conversion from an amplitude modulated UHF wave obtained from an original frequency modulated UHF wave into an amplitude modulation wave of a different carrier frequency, the influence of the original frequency modulation component included in the treated amplitude modulated wave is entirely isolated from entering into the carrier wave of the output side so that in addition to the simplification of the circuit a great advantage of stabilized carrier frequency can be obtained. More especially, by additionally employing a non-reciprocal circuit such as a circulator, or a directional coupler at the input-output circuit, the supply of input VHF carrier wave to the non-linear element and the delivery of modulated VHF signal can be effected very steadily so that utility of the carrier converting equipment using a non-linear element can still be improved. In other words, by matching the input-output resistance of the circulator and the variation of the resistance of the diode, an amplitude modulationn even at a 100% ratio can be obtained.

In the present television broadcasting system in which a broadcasting satellite transmits multi-channel broadcasting signals in one channel spacing electromagnetic wave, local oscillation signals of a corresponding number of channels are required and the frequency of the respective local oscillation signal must be stabilized such as for instance by using crystal control per each channel. Contrary to the above, according to the present invention, the receiving side must have only one frequency stabilized oscillator even in case of multi-channel broadcasting and the selection of a receiving channel may be effected by selectively inserting a filter circuit having a suitable selecting characteristic in a stage of SHF to UHF conversion in a very easy and high quality manner.

Furthermore, according to the present invention the utilization of the non-linear effect is completed by once so that the circuit may be simplified. At the same time the loss has been decreased and the function can be improved if compared with the conventional manner in which the FM signal is once demodulated to a video signal and by using the video signal the different carrier wave is again modulated, i.e., double utilization of the non-linear effect.

In the conventional system in order to give an amplitude modulation to a desired carrier wave it is required for modulating a signal having about 10 dBm level that a video amplifier for the modulation signal be used. Contrary to the above, in the present invention, it suffices to treat a UHF signal of about −10 dBm so that the number of active elements can be reduced.

The present invention is not limited to the embodiment mentioned above, and various modifications are possible. For instance, as the non-linear element for the carrier conversion, a Schottky diode may be used instead of the tunnel diode as mentioned above. Furthermore, as the input UHF signal power is in the order of +10 dBm, an ordinary detection diode may be used. Furthermore, the diode is not limited to the variable resistance diode but a variable capacitance diode such as variator, etc., may used.

In the foregoing embodiments, a conversion between UHF-AM to VHF-AM has been illustrated, however, the present invention is not limited to a case in which the input signal is a UHF wave and an output signal is a VHF wave, but may be applied to any conversion between an amplitude modulation wave to any kind of amplitude modulation wave of any frequency as long as the $f_i$, $f_m$ components are in a separable relationship.

Also in the foregoing explanation, the amplitude modulation adding circuit Q has been explained to produce an amplitude modulated wave which has a larger amplitude at higher frequency and smaller amplitude at lower frequency. However, a same result can be obtained by modifying said circuit Q so as to produce an amplitude modulated signal having larger amplitude at lower frequency and smaller amplitude at higher frequency.

Furthermore, in the foregoing explanation at the conversion from the FM wave to the AM wave a case in which the modulation frequency band characteristics are made flat was described. In this case, the impedance in the modulating frequency band viewed from diode *d* to the circuit should be made as low as possible. However, in case the modulating frequency band characteristics are selected to be a suitable form under an object of deemphasis, etc., by choosing the impedance at the modulation frequency band viewed from the diode to the circuit any desired band characteristics can be allocated.

What is claimed is:

1. A carrier converting equipment for converting an amplitude modulated signal of a first carrier wave into a corresponding amplitude modulation signal of a second carrier wave of which the frequency is different from that of the first carrier wave, the equipment comprising;

a non-linear element which is variable in conductance, means for applying said first and second carrier waves to said non-linear element, and means for deriving an amplitude modulated second carrier wave which is modulated in accordance with the variation of the conductance of said non-linear element, which variation corresponds to the amplitude variation of said amplitude modulated first carrier wave so that the second carrier wave is amplitude modulated according to the amplitude of the first carrier wave.

2. A carrier converting equipment as claimed in claim 1, further comprising an amplitude modulation adding circuit which modulates a frequency modulated input carrier wave in amplitude so as to produce an amplitude modulated carrier signal, which amplitude modulation corresponds to the frequency modulation of the input carrier wave, wherein the amplitude modulated carrier signal is used as the first carrier wave.

3. A carrier converting equipment as claimed in claim 1, wherein the non-linear element is a variable resistance diode.

4. A carrier converting equipment as claimed in claim 2, wherein the non-linear element is a variable resistance diode.

5. A carrier converting equipment as claimed in claim 1, wherein the first and second carrier waves are isolated from each other by series and/or parallel resonant circuits connected in series and/or parallel with said non-linear element.

6. A carrier converting equipment as claimed in claim 2, wherein the first and second carrier waves are isolated from each other by series and/or parallel resonant circuits connected in series and/or parallel with said non-linear element.

7. A carrier converting equipment as claimed in claim 1, wherein the non-linear element is connected to a first terminal of a non-reciprocal element to which said first carrier wave is applied, the second carrier wave is applied to a second terminal of the non-reciprocal element and is fed to the non-linear element via the non-reciprocal element and the amplitude modulated second carrier wave is derived out from a third terminal of the non-reciprocal element.

8. A carrier converting equipment as claimed in claim 2, wherein the non-linear element is connected to a first terminal of a non-reciprocal element to which said first carrier wave is applied, the second carrier wave is applied to a second terminal of the non-reciprocal element and is fed to the non-linear element via the non-reciprocal element and the amplitude modulated second carrier wave is derived out from a third terminal of the non-reciprocal element.

9. A carrier converting equipment as claimed in claim 7, wherein the non-reciprocal element is a circulator.

10. A carrier converting equipment as claimed in claim 8, wherein the non-reciprocal element is a circulator.

11. A carrier converting equipment as claimed in claim 7, wherein the non-reciprocal circuit is a −3dB directional coupler.

12. A carrier converting equipment as claimed in claim 8, wherein the non-reciprocal circuit is a −3dB directional coupler.

* * * * *